S. CHINN.
AUTOMOBILE ATTACHMENT.
APPLICATION FILED MAR. 1. 1916.
1,193,236.                                    Patented Aug. 1, 1916.
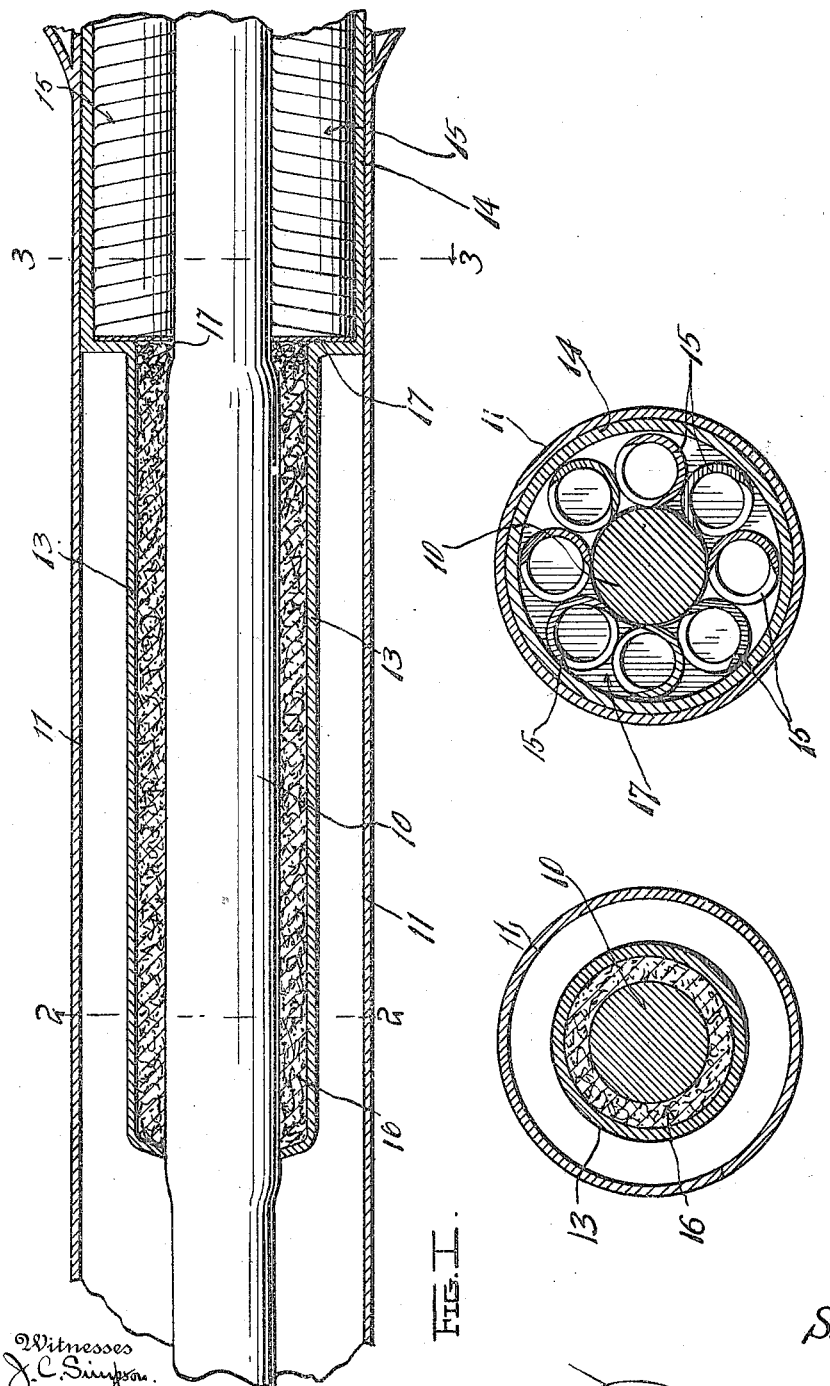

UNITED STATES PATENT OFFICE.

SAMUEL CHINN, OF LOS ANGELES, CALIFORNIA.

AUTOMOBILE ATTACHMENT.

1,193,236.   Specification of Letters Patent.   Patented Aug. 1, 1916.

Application filed March 1, 1916. Serial No. 81,427.

*To all whom it may concern:*

Be it known that I, SAMUEL CHINN, a citizen of the United States, residing at Los Angeles, in the county of Los Angeles, State of California, have invented certain new and useful Improvements in Automobile Attachments; and I do hereby declare the following to be a full, clear, and exact description of the invention, such as will enable others skilled in the art to which it appertains to make and use the same.

This invention relates to improvements in automobile attachments and particularly to devices for preventing the escape of oil from the differential to the rear wheels.

One object of the invention is to provide a device of this character which is particularly adapted for application within the housing tube of the rear axle of an automobile, to absorb and retain the lubricant from the differential gearing and prevent the same running to the rear wheels through the said housing which would result in dripping onto the wheel and tire with the consequent rotting of the tire.

Other objects and advantages will be apparent from the following description when taken in connection with the accompanying drawing.

In the drawing: Figure 1 is a longitudinal sectional view through the rear axle housing tube of a Ford automobile, showing the application of my invention; Fig. 2 is a transverse section on the line 2—2 of Fig. 1; and Fig. 3 is a transverse section on the line 3—3 of Fig. 1.

Referring particularly to the accompanying drawing, 10 represents the rear axle of an automobile, around which is disposed the housing tube 11. One end of this tube is connected to the differential casing (not shown) while the other end is disposed adjacent the rear wheel of the automobile. Disposed within the housing tube, and surrounding the axle is a sleeve 13, the inner end, or the end toward the differential housing, being inturned so as to lie in close proximity or engagement with the peripheral face of the axle. The other end of the sleeve is enlarged, as shown at 14 and receives therein the roller bearings 15. Within the main portion of the sleeve, and encircling the axle is a felt sleeve 16, and at a point between the main portion of the sleeve and the enlarged portion is arranged a thin metal disk 17. The sleeve is fitted snugly within the housing tube so that it will not rotate with the axle, but remain stationary.

In the ordinary construction of the rear axle of the Ford automobile, and of other similar constructions, the oil and grease from the differential gear runs through the housing tube of the rear axle, and escapes onto the wheels, from which it is splashed as the wheels rotate, and at the same time drips or splatters onto the tires, which latter is very detrimental to the tires and causes them to rot in a short time. The particular object of this invention is to prevent the grease and oil from escaping through the housing tube. The oil and grease from the differential will be absorbed by the felt sleeve, thus thoroughly protecting the wheels and tires from damage.

The device is extremely simple in construction, cheap to manufacture, and can be installed in an automobile at a comparatively low cost.

What is claimed is:

1. An automobile attachment for disposition within the rear axle housing tube and differential casing comprising a sleeve fitted within the tube and surrounding the axle, one end of the sleeve having an enlarged portion for the reception of the axle roller bearings, and an absorbent sleeve disposed within the said sleeve and intimately surrounding the axle.

2. A lubricant retainer for automobile axles consisting of a casing extending toward the side from the differential gearing of an automobile and closing in on the axle at its free end, and an absorbent packing material disposed within the casing and surrounding the axle.

In testimony whereof, I affix my signature in the presence of two witnesses.

SAMUEL CHINN.

Witnesses:
J. B. GRAHAM,
ARTHUR BEAUMONT.

Copies of this patent may be obtained for five cents each, by addressing the "Commissioner of Patents, Washington, D. C."